July 3, 1962  G. F. COLE ET AL  3,042,395
SPRING ASSEMBLY

Filed June 1, 1960  2 Sheets-Sheet 1

INVENTORS
George Francis Cole
Alfred Turley
BY
A. Yates Dowell
ATTORNEY

July 3, 1962  G. F. COLE ET AL  3,042,395
SPRING ASSEMBLY
Filed June 1, 1960  2 Sheets-Sheet 2
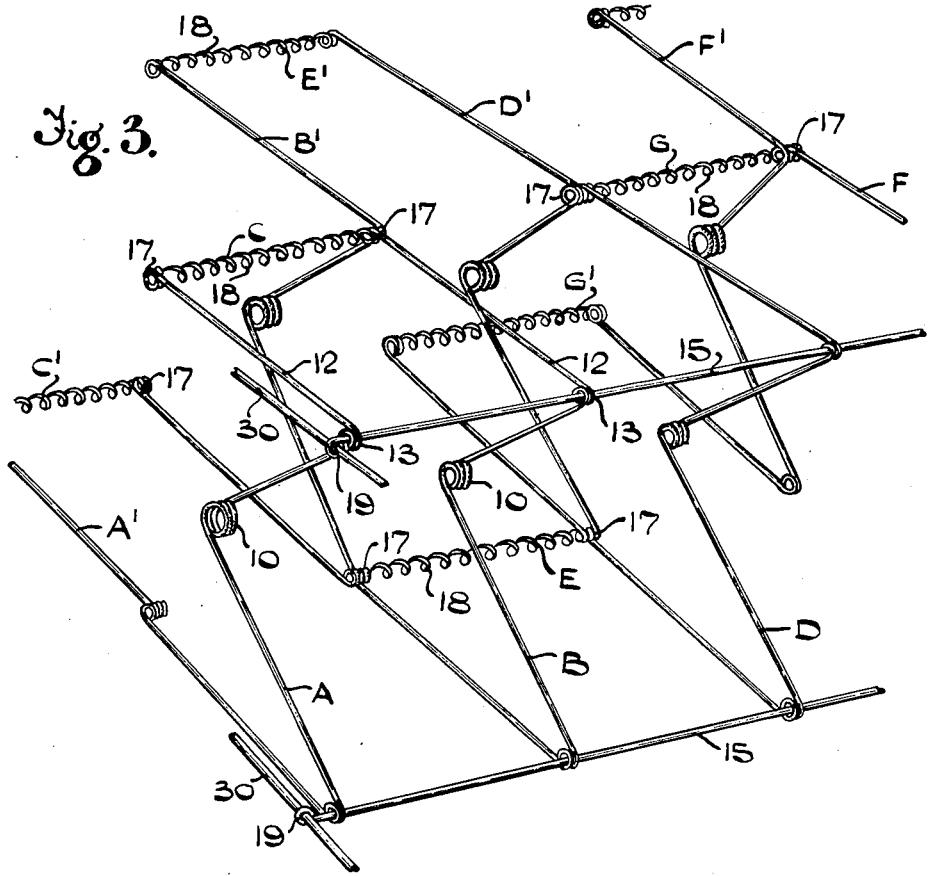
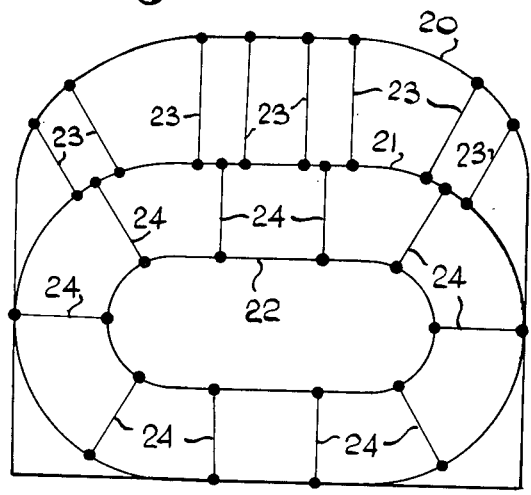
INVENTORS
George Francis Cole
Alfred Turley
BY
A. Yates Dowell
ATTORNEY.

United States Patent Office 3,042,395
Patented July 3, 1962

3,042,395
SPRING ASSEMBLY
George F. Cole, Barston, Hampton-in-Arden, and Alfred Turley, Bushbury, Wolverhampton, England, assignors to Vono Limited, Tipton, England, a British company
Filed June 1, 1960, Ser. No. 33,284
Claims priority, application Great Britain Sept. 9, 1959
3 Claims. (Cl. 267—108)

This invention relates to spring assemblies which are used for the interiors of seats and mattresses and other articles of furniture for seating or reclining upon and which are also used in other seats such as cars, aircraft, vehicles and other means of transportation and therefore the spring assemblies forming the subject of the present invention are capable of use in a wide variety of applications and are not restricted to normal domestic furniture.

The majority of such spring assemblies to-day make use of a number of helical coil springs assembled with their axes in generally parallel relationship and connected together at their ends and covered and upholstered with suitable padding and other materials. The manufacture of such spring assemblies is relatively complex and a considerable amount of metal is used in providing the required number of helical springs.

The object of the present invention is to provide an improved spring assembly having greater comfort value than is obtained with existing spring assemblies comprising a plurality of coil springs assembled together and also a further object is to provide an improved spring assembly containing less metal and therefore of less weight than the known type of spring assembly incorporating coil springs and of the same size.

According to the present invention, we provide a spring assembly comprising a plurality of similar spring units connected together, each unit being made from wire and comprising a pair of arms extending in acute angular relationship from a coil portion formed integrally with the arms so that the arms lie in the same general plane as the coil and are arranged so that movement of the arms towards or away from each other stresses the coil portion tending to restore the arms to their initial position in which the coil portion is unstressed, one arm at least having its free end formed, or adapted to be hingedly connected to an adjacent unit whereby two or more of such units may be connected together in a common plane or in mutually parallel planes, a spring assembly being made from a number of such sub-assemblies of two or more connected units.

In a very simple form of spring assembly according to the invention, the individual units may each be of substantially V-formation with the coil portion formed at the apex of the V.

With this simple form of spring unit, a complete spring assembly may be formed by having a number of lines of such units connected in spaced parallel relationship to form the length and breadth of the assembly, each such line being formed by connecting together a number of the units so that a free end of one V unit is hingedly connected to the apex of the next unit and so on.

The depth of such an assembly is then equal to the vertical from one arm of a V to the opposite free extremity. Such an assembly may be used in cases where no great depth is required (such as in the seat squabs in motor vehicles) or where a great degree of resilience is not called for.

However where greater depth and a greater degree of resilience are required which may not conveniently be obtained with units of simple V-formation, then a spring assembly may be produced according to a further aspect of the invention.

According to this further aspect of the invention, we provide a spring assembly comprising a plurality of similar spring units connected together, each unit being made of wire and comprising a substantially M shaped figure lying on its side in the operative position and the central apex of the figure being formed as a spring coil in the wire which coil is stressed when the two inner arms are moved towards each other, each of the two outer arms having its free end formed, or adapted to be hingedly connected to the corresponding outer arm of an adjacent unit whereby two or more of such units are connected together in a common general plane or in mutually parallel planes and a number of such sub-assemblies of two or more connected units being connected together to form a spring assembly.

For example, a mattress, or seat foundation or cushion may have a spring assembly built-up from a number of lines of such M units, the lines being connected in spaced parallel relationship to make the length and breadth of the assembly and each line being a number of the M units connected hingedly together as described above so that they lie in a common plane.

The spaced lines of units may be connected together by means of wires or rods threaded through the hinge connections between adjacent units on the upper and lower faces of the assembly, or other forms of connecting means may be used as mentioned hereinafter.

For ease of understanding, the rows of spring units in which adjacent units are connected together hingedly will be termed "longitudinal" rows. It will be appreciated that in a spring assembly the units will also lie in "transverse" rows (i.e. extending from side-to-side) and another feature of the invention is to make a transverse row of units from a single length of wire.

According to this feature of the invention a transverse row of units comprising two or more units is made from a single length of wire wherein the free end of an arm of a unit is extended at right angles to the plane of the unit to form an integral connecting portion and join up with the free end of an arm of the next adjacent unit in the transverse row. As will be understood this formation can be continued all along the transverse row so that all the units are integrally connected and can be formed from a single length of wire. This provides a means for an economical mass production of transverse rows of the spring units by means of a machine which can act upon and form a single length of wire into the plurality of connected units.

Further the connecting portion between adjacent units may be of spiral form so that transversely extending wires may be threaded through the spirals to stabilize the assembly and also provide the means for hingedly connecting the units in one transverse row to those in another transverse row.

The invention is illustrated in the accompanying drawings wherein:

FIGURE 3 is a perspective view of part of a spring assembly showing the formation of transverse rows of units form a single length of wire.

FIGURE 4 is a plan view which shows diagrammatically the application of the invention to a car seat.

FIGURE 5 is a diagrammatic view showing the invention applied with individual units of V form.

Figure 2:
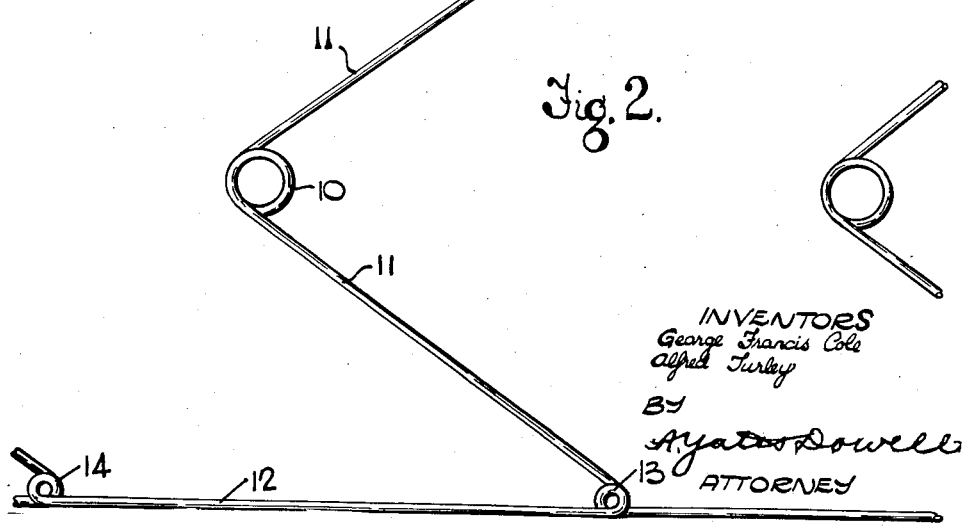
FIGURE 2 is a side elevation of a part of the assembly.

Referring first to FIGURE 2, the individual unit shown there is made from wire so that it is in the form of an M which is lying on its side in the operative position and at the central apex of the M the wire is formed into a coil 10 which may conveniently consist of two full inner coils and two partial outer coils from which extend the inner arms 11. The outer arms 12 are connected to the inner arms 11 by two further coils 13 of smaller diameter than the coil 10 and these coils 13 may also conveniently comprise two complete inner coils and two partial outer coils.

The expression "operative position" defines the working position of the assembly wherein the loading will be applied in directions which are transverse to the directions of the arms 12 of the units and the M unit is considered to be lying on its side in relation to the direction of applied load.

Figure 1:
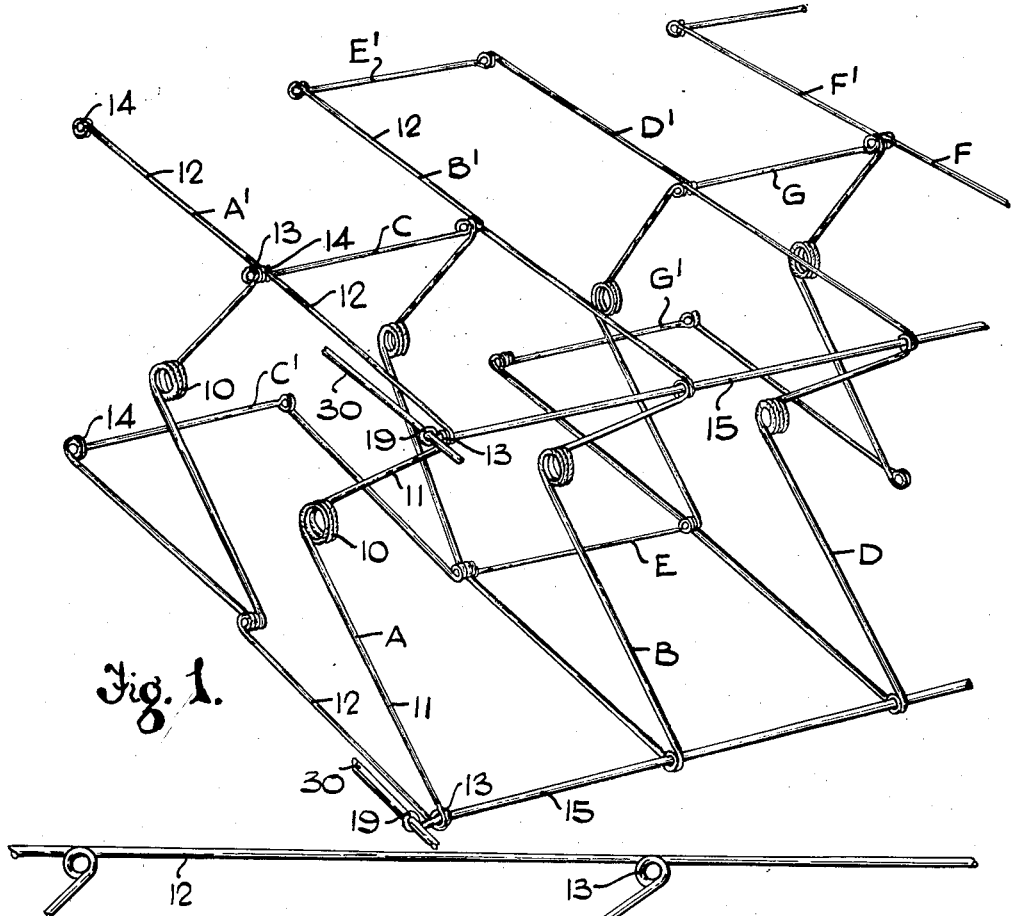
FIGURE 1 is a perspective view of a part of a spring assembly in which certain alternative forms of connection have been illustrated.

At the free end of each arm 12 there is formed a further coil 14 (see FIGURE 1).

A number of such individual units could be assembled together to form a spring assembly such as for example, the spring interior of a mattress, by arranging longitudinally extending rows of the units in spaced parallel relationship, but for commercial production of spring assemblies the arrangement depicted in FIGURE 1 is used in which a transverse row consisting of a number of units is produced in a machine which operates upon a continuous length of wire to form individual units connected together in spaced parallel relationship.

Thus, referring to FIGURE 1 there would be unit A connected to unit B by the integral transverse connecting portion C; unit D connected to unit B by the integral transverse connecting portion E; and unit F connected to unit D by the integral connecting portion G and so on across the whole width of the assembly so that the individual units A, B, D, F, etc. forming a transverse row are connected by the transverse connecting portions C, E, G, etc. all from one length of wire.

In producing such continuous row of units the machine will also form the wire into the larger diameter coils 10 and the smaller diameter coils 13 and 14.

A similar transverse row of units A', B', D', F', etc. connected together by C', E', G etc. is placed alongside the first row and so on to build up the complete length of the spring assembly, and it will thus be seen that units A, A' etc. are in a line in a common plane parallel to the common plane containing units B, B' etc. and so on. As will be understood from FIGURE 1 the coils 14 of units A and B go on the insides of the ends of the arms 12 of A' and B' so as to be in axial alignment with the coils 13 of A' and B' and so on.

Further, it will be observed that the row A', B', D', F' etc. is staggered in relation to row A, B, D, F, etc. Thus connecting portion E' is opposite the gap between connecting portions C and G, and likewise connecting portion E is opposite the gap between connecting portions C' and G'. If the rows were not staggered like this there would be at top and bottom of the assembly, alternate gaps running longitudinally from end-to-end of the assembly.

If, instead of being made from one length of wire, the individual units A, B, D, etc. are made separately, they may be assembled together in the relationship shown in FIGURE 1 and held in assembled relationship by means of transverse wires threaded through the aligned sets of coils 13 and 14. Two of such wires are shown at 15 in FIGURE 1; as will be understood similar transverse wires would be threaded through at the other appropriate positions but for the purpose of clarity these have not been shown in the drawing. In order to maintain the spaced relationship between adjacent longitudinal rows, spacer sleeves (not shown) would be provided upon such transverse wires 15 so as to hold the individual units A, B, D, in spaced relationship or alternatively, the transverse wires 15 might be formed with crimped portions to locate the individual units A, B, D, etc. in their correct positions.

When the units A, B, D etc. are formed from a continuous length of wire the connecting portions C, E, G, etc. would be cranked out of alignment with the coils 13, 14 to allow transverse wires such as shown at 15 to be threaded through and crimped at spaced positions to locate the transverse rows, or clips could be used to connect the coils 13, 14 to such transverse wires.

Referring to the modification shown in FIGURE 3, when units A, B, D etc. are formed from a continuous length of wire, each of the transverse connecting portions C, E, G etc. may be formed by the machine into coils 17 and an open spiral 18 extending between the extremities of the arms 12 and then the transverse rows of units may be assembled together by threading the transverse connecting wires 15 through the coils 13, 17 and through the spirals 18 which constitutes the transverse connecting portions C, E, G. With such an arrangement spacer sleeves would not be required upon the transverse wires 15.

Instead of transverse wires 15, the small coils 13 and 14 in adjacent units (FIGURE 1) or the coils 13 and 17 and spirals 18 (FIGURE 3) may be joined together by a short hinge pin having its ends turned over to hold it in position and this arrangement may have certain advantages in practice where it is desired to have independent areas of resilience across the width of the spring assembly so that when one portion is depressed, the depression thereof would not be transmitted to surrounding areas to the same extent as it would be in the case where the units are connected by continuous transverse wires such as 15. In other cases, where transverse stability is important, wires such as 15 are preferable.

With the above described arrangements, it will be observed that the connection between units A, B, D, in one transverse row and the units A', B', D', in the next row is by means of pure hinge connections through the small coils 13 and 14 or 17 and there is no connection between the larger diameter coils 10 which are therefore free to perform pure torsional action whilst there is pure hinge action between adjacent units in adjacent transverse rows. This is found to give a greater degree of comfort value in a mattress or seat than is obtained with coil springs laced together because in the latter, there is no pure hinge action between coils in adjacent rows.

As indicated in FIGURES 1 and 3, the transverse connecting wires 15, where used, may have their ends 19 turned over to form eyes and longitudinally extending wires 30 may be threaded through these eyes to tie together the ends of the transverse connecting wires.

If the pattern depicted in FIGURE 1 or FIGURE 3 is repeated from one end to the other of the spring assembly (e.g. a mattress) it will be appreciated that at one end the units A, B, D, etc. will have their open mouths pointing outwardly whereas, at the opposite end the units will have the large diameter coils 10 pointing outwardly and consideration will show that at this end the assembly will be stiffer than at the other end which has the open mouths of the units. In order to avoid one end being softer than the other end, a number of the units A, B, D, etc. at this soft end may be reversed so that the coils will point outwardly; alternatively further units may be incorporated at this end with the coils pointed outwardly or some other form of spring provided so as to give this end of the mattress the same degree of resilience as the other end.

Further, along the side edges of a mattress, extra individual units may be incorporated reversed in position in relation to the existing units to stiffen up the side walls of the mattress.

FIGURE 4 is a diagrammatic plan view illustrating an application of the invention to a seat such as a car seat and in this application the periphery or the contour of the car seat in plan would be defined by an outer frame wire 20 in which is assembled two inner frame wires 21 and 22 which are of generally oval form in plan view, this pattern of inner and outer frame wires being repeated on the underside of the seat and then individual units 23 and 24 may be connected between the frame wires 20 and 21 and between the frame wires 21 and 22 by hinging the coil ends 13 and 14 of the M shaped units to the frame wires at the top and at the bottom of the seat. It will be understood that in FIGURE 4 the spring units are in planes which are normal to the plane of the paper and therefore only the top arm of each unit is seen.

With this arrangement, any desired pattern of resilience may be built up by the choice of suitable frames 21 and 22 and by the disposition of the individual units 23, 24 in between the frame wires.

For example, instead of using oval shaped frame wires 21 and 22, a rectangular section of the seat area may be constituted by an assembly made up as in FIGURE 1 which can be placed in position and then connected to an exterior frame wire 20 of the desired contour by individual spring units of appropriate size and shape.

Referring now to the modification which is illustrated diagrammatically in FIGURE 5. For a spring assembly of less depth than the average mattress seat, a modified form of unit may be employed which is substantially in the form of a V, the apex of which constitutes a torsional coil. A number of such units may be connected in line by hingedly connecting the free end of one V to the apex of another V and so on to build up a line of such units and then a number of such lines connected in spaced parallel relationship to build up the width of the desired assembly. Such an assembly may, for example, be used in the seat squab in motor vehicles which is generally of less depth than the average seat. Such V shape unit may also be produced from a continuous length of wire in transverse rows in the same manner as depicted in FIGURE 1 for the M shaped units.

Also such V units may be used at the side or ends of an assembly made up from M units in cases where it is desired to reduce the depth of the assembly around the sides or ends.

What we claim then is:

1. A spring assembly comprising a plurality of transverse rows of spring units, each row being formed from a single length of wire and comprising several spring units each of which comprises a substantially M-shaped figure lying on its side in the operative position so as to have upper and lower outer arms arranged horizontally and each outer arm being connected to the central apex of the M by an inclined inner arm, with spring coils formed at the central apex and at the outer apex between each outer arm and its associated inner arm, and a coil formed at the free end of each outer arm, being the end which is remote from the associated inner arm, the several spring units being located in spaced parallel planes and all connected together by virture of the fact that the said free end of an outer arm of one unit is extended at right angles to the plane of the unit to form an integral connecting portion by being joined integrally with the corresponding free end of an outer arm of the next adjacent unit and so on from end to end of a transverse row, one transverse row being connected to another by means of wires threaded through the said coils at the said free ends of the outer arms of the units in one row and through the coils at the said outer apices of the units in the adjacent row.

2. A spring assembly according to claim 1 wherein the integral connecting portions in one transverse row are staggered in relation to those in the next transverse row.

3. A spring assembly according to claim 1 wherein the integral connecting portion between adjacent units in a transverse row is of spiral form so that transversely extending wires can be threaded through the spirals to stabilize the assembly and provide the means for hingedly connecting the units in one transverse row to those in another transverse row.

References Cited in the file of this patent

UNITED STATES PATENTS

| 536,123 | Beall | Mar. 19, 1895 |

FOREIGN PATENTS

| 12,322 | Great Britain | Dec. 21, 1888 |
| 754,074 | France | Aug. 21, 1933 |
| 832,312 | France | June 27, 1938 |